(12) United States Patent
Beltran et al.

(10) Patent No.: US 11,054,078 B2
(45) Date of Patent: Jul. 6, 2021

(54) DRY LINERS FOR PIPE REPAIR AND METHODS FOR MANUFACTURING DRY LINERS

(71) Applicant: Owens Corning Intellectual Capital, LLC, Toledo, OH (US)

(72) Inventors: Antoni Serarols Beltran, Suria (ES); Kees Den Besten, Elburg (NL)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 127 days.

(21) Appl. No.: 16/466,785

(22) PCT Filed: Jan. 5, 2018

(86) PCT No.: PCT/US2018/012452
§ 371 (c)(1),
(2) Date: Jun. 5, 2019

(87) PCT Pub. No.: WO2018/132305
PCT Pub. Date: Jul. 19, 2018

(65) Prior Publication Data
US 2019/0338880 A1 Nov. 7, 2019

(30) Foreign Application Priority Data
Jan. 11, 2017 (EP) .................................... 17382006

(51) Int. Cl.
*F16L 55/165* (2006.01)
*B29C 53/60* (2006.01)
*B29C 63/32* (2006.01)

(52) U.S. Cl.
CPC .......... *F16L 55/1656* (2013.01); *B29C 53/60* (2013.01); *B29C 63/32* (2013.01)

(58) Field of Classification Search
CPC ... F16L 55/18; F16L 55/16; F16L 9/14; B29C 66/49; B29C 65/4835
(Continued)

(56) References Cited

U.S. PATENT DOCUMENTS 3,369,426 A 2/1968 Matz, Jr.
4,010,054 A 3/1977 Bradt
(Continued)

FOREIGN PATENT DOCUMENTS

EP 2273171 A1 1/2011
KR 20160105257 A 9/2016
(Continued)

OTHER PUBLICATIONS

Extended European Search Report from EP Application No. 17382006.9 dated Jun. 27, 2017.
(Continued)

*Primary Examiner* — Patrick F Brinson
(74) *Attorney, Agent, or Firm* — Calfee, Halter & Griswold LLP

(57) ABSTRACT

A method of manufacturing a dry liner for reinforcing a pipe includes spirally winding a glass fiber-reinforced, continuous material around a mandrel such that a subsequent layer of the glass fiber-reinforced, continuous material at least partially overlaps a preceding layer of the material to form an overlapping region and affixing the subsequent layer of material to the preceding layer of material in the overlapping region prior to impregnating the dry liner with a resin to form a CIPP liner.

20 Claims, 9 Drawing Sheets

(58) Field of Classification Search
USPC .... 138/129, 130, 144, 154, 97, 98; 156/184, 156/169, 173
See application file for complete search history.

(56) References Cited

U.S. PATENT DOCUMENTS

| | | | |
|---|---|---|---|
| 4,081,303 | A | 3/1978 | Rogers et al. |
| 4,104,095 | A | 8/1978 | Shaw |
| 5,223,066 | A | 6/1993 | Dokmo et al. |
| 5,798,013 | A | 8/1998 | Brandenburger |
| 6,042,668 | A | 3/2000 | Kamiyama et al. |
| 6,228,312 | B1 | 5/2001 | Boyce |
| 6,241,840 | B1 | 6/2001 | Pratt et al. |
| 6,360,780 | B1 | 3/2002 | Adolphs et al. |
| 6,615,875 | B2 | 9/2003 | Adolphs et al. |
| 6,679,966 | B1 | 1/2004 | Brandenburger |
| 7,374,127 | B2 | 5/2008 | Gallagher et al. |
| 8,636,869 | B2 | 1/2014 | Wiessner et al. |
| 8,967,220 | B2 | 3/2015 | Gryta |
| 9,310,014 | B2 * | 4/2016 | Ekelund ............... B29C 63/10 |
| 2003/0113489 | A1 | 6/2003 | Smith |
| 2007/0267785 | A1 | 11/2007 | Bellamy et al. |
| 2009/0205733 | A1 * | 8/2009 | Stringfellow ....... F16L 55/1652 138/104 |
| 2009/0308475 | A1 * | 12/2009 | Stringfellow ........... F16L 11/12 138/98 |
| 2012/0291903 | A1 * | 11/2012 | Ekelund .............. F16L 55/1657 138/97 |
| 2015/0246501 | A1 | 9/2015 | Den Besten et al. |
| 2016/0053922 | A1 | 2/2016 | Ehsani |

FOREIGN PATENT DOCUMENTS

| | | |
|---|---|---|
| WO | 9956943 A1 | 11/1999 |
| WO | 2012065698 A2 | 5/2012 |
| WO | 2012122270 A1 | 9/2012 |
| WO | 2012145422 A1 | 10/2012 |
| WO | 2016064885 A1 | 4/2016 |

OTHER PUBLICATIONS

International Search Report and Written Opinion from PCT/US2018/012452 dated Mar. 29, 2018.
Office Action from CN Application No. 201880006406.7 dated Feb. 20, 2021.

* cited by examiner

DRY LINERS FOR PIPE REPAIR AND METHODS FOR MANUFACTURING DRY LINERS

RELATED APPLICATIONS

This application is the U.S. national stage entry of PCT/US2018012452, filed on Jan. 5, 2018, which claims priority to and all benefit of European Patent Application Serial No. 17382006.9, filed on Jan. 11, 2017 and titled DRY LINERS FOR PIPE REPAIR AND METHODS FOR MANUFACTURING DRY LINERS, the entire disclosure of which are fully incorporated herein by reference.

FIELD

The present application relates to liners for rehabilitating damaged or deteriorated piping systems and to methods of manufacturing such liners.

BACKGROUND

Underground piping systems are essential for transporting liquids and gases to homes and businesses. Utilities typically use these piping systems for sewer, water, gas, and other applications. Such piping systems are installed several feet underground and access to the piping systems is therefore limited.

Underground pipes experience cyclical loading, premature wear, corrosion, and ambient foundation or earth movements. As a result, pipes may develop damaged or weakened areas that require repair. To maintain the service afforded by the underground piping system, any cracks or leaks must be promptly detected and repaired. Repair of a small section of the pipe by welding, patching, or otherwise is usually unsatisfactory and difficult because the pipe diameter does not allow human access in safe conditions. Likewise, digging up and replacing a section of pipe is difficult, expensive, and time consuming.

A solution for the repair of underground pipes is to repair a pipe while it is still in place. Some in-situ pipe repair procedures include the insertion of a pliable reinforcement liner into the damaged pipe. There are several types of reinforcement or reinforcing liners. Some reinforcement liners include glass fibers for support and strength.

The liner may be installed into the damaged pipe from one point of entry to another by one of several known techniques. The liner typically has an outer diameter which is substantially the same as, or slightly smaller than, the inner diameter of the damaged pipe. The liner is pressurized so that it presses firmly along the inner wall of the damaged pipe. The liner is impregnated with a resin, such as a styrenated resin, prior to insertion into the pipe. The resin impregnating the expanded liner is then cured to form a new, rigid lining or surface within the original pipe. Liners that are hardened or cured after they have been installed are referred to as "cured-in-place pipe (CIPP)" liners. The resin may be cured by one of several known techniques, such as steam or UV curing.

Production methodologies for producing CIPP glass liners include a winding process. In a conventional winding process 100 (FIG. 1), fabric rolls of a limited width are first impregnated with a resin/thickening agent mixture and rewound for maturation. After a defined maturation period, the pre-impregnated rolls are unwound and the associated fabric 102 is spirally wound onto a mandrel 104 that is covered in a thermoplastic foil film layer 106, as shown in FIG. 1. The mandrel 140 rotates about a longitudinal axis Y. As the fabric is spirally wound, the edge of the fabric overlaps the edge of the underlying fabric layer. The tackiness of the pre-impregnated resin/thickening agent mixture fixes or holds the overlying fabric in position on the underlying fabric. The winding operation continues until the required laminate thickness is achieved. The pre-impregnated fabric is then covered by an outer thermoplastic foil film layer and protected against daylight/UV light during storage and transport.

A polyester or vinyl ester resin system containing a styrene monomer is often used as the resin in CIPP liners. Since styrene monomer is an environmentally hazardous material, the handling, shipping, and storing of the saturated liners must be done in compliance with various regulations. Furthermore, the resin, in a saturated liner, accounts for a significant portion (e.g. approximately half) of the total weight of the impregnated liner. Thus, handling and shipping a resin-saturated liner can be cumbersome and expense.

SUMMARY

The present application describes methods for manufacturing dry liners. In an exemplary embodiment, the method includes spirally winding dry, glass fiber-reinforced, continuous material around a mandrel such that a subsequent layer of the glass fiber-reinforced, continuous material at least partially overlaps a preceding layer of the material to form an overlapping region. The method further includes affixing the subsequent layer of material to the preceding layer of material in the overlapping region.

The present application also describes a dry liner for reinforcing a pipe. In an exemplary embodiment, the liner includes a spirally wound, glass fiber-reinforced material forming a first layer and a second layer that at least partially overlaps the first layer to form an overlapping region. The exemplary liner further includes a material that affixes the first layer to the second layer in the overlapping region.

The present application also describes a glass fiber-reinforced material for use in forming a dry liner for reinforcing a pipe. In an exemplary embodiment, the glass fiber-reinforced material includes a reinforcing layer including glass fibers, the reinforcing layer having a top surface, a bottom surface opposite the top surface, a first edge portion, and a second edge portion opposite the first edge portion. The glass fiber-reinforced material also includes a plurality of thermoplastic fibers positioned proximate to at least one of the first edge portion and the second edge portion.

Further features and advantages of the invention will become apparent from the following detailed description made with reference to the accompanying drawings.

BRIEF DESCRIPTION OF THE DRAWINGS

For a fuller understanding of the nature and advantages of the general inventive concepts, reference should be had to the following detailed description taken in connection with the accompanying drawings, in which.

DETAILED DESCRIPTION

Figure 1:
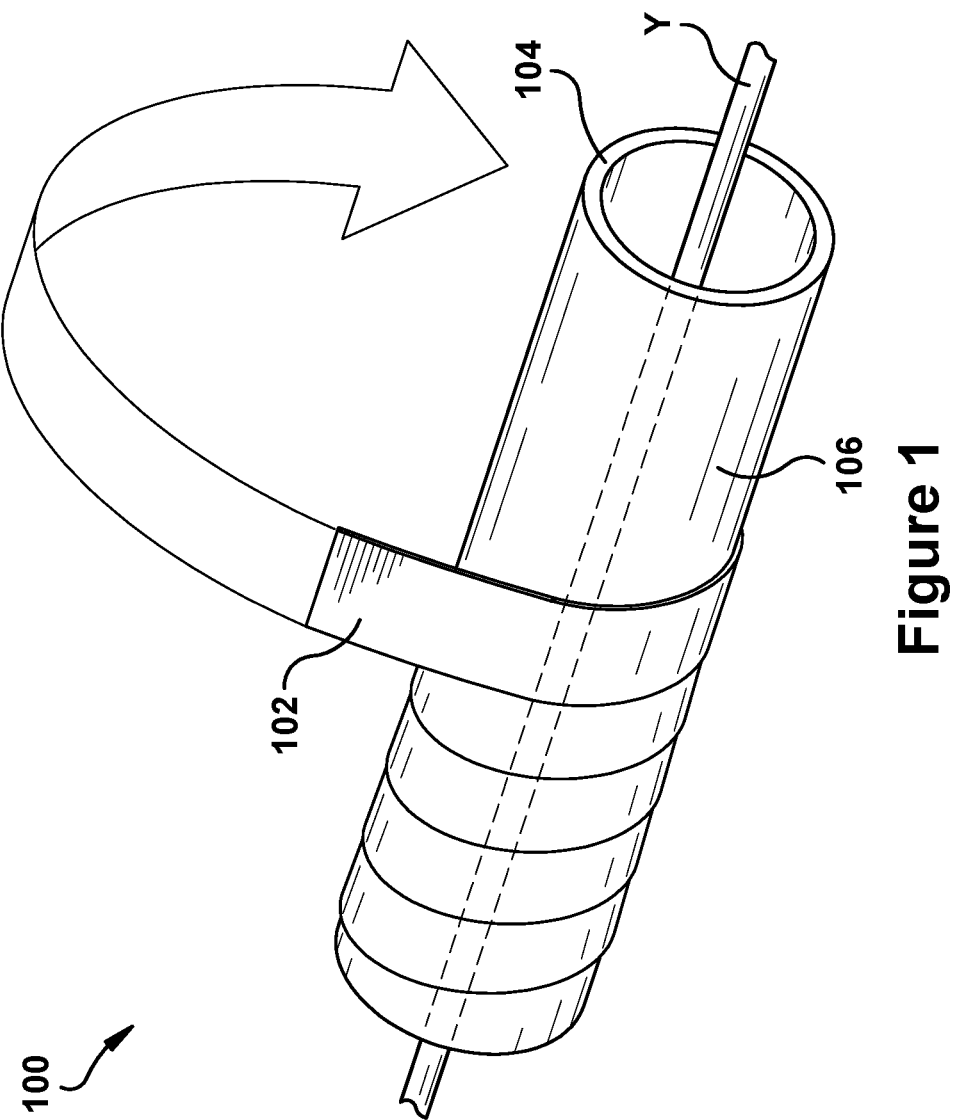
FIG. 1 is a perspective view of a conventional CIPP liner formed by a winding process.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

Unless otherwise defined, the terms used herein have the same meaning as commonly understood by one of ordinary skill in the art encompassing the general inventive concepts. The terminology used herein is for describing exemplary embodiments of the general inventive concepts only and is not intended to be limiting of the general inventive concepts. As used in the description of the general inventive concepts and the appended claims, the singular forms "a," "an," and "the" are intended to include the plural forms as well, unless the context clearly indicates otherwise.

The present application describes various exemplary dry repair liners for reinforcing pipe and methods for forming the dry liners. The term "dry liner" refers to a liner in which the fabric, nonwoven, or combination thereof, used to form the liner has not yet been impregnated with the resin material that will be used to harden or cure the liner, after the liner has been installed inside the pipe. In this application, the resin that is used to harden or cure the liner after the liner has been installed inside the pipe is referred to as "in-pipe cured" (IPC) resin to distinguish over resins or adhesives used for other purposes.

Impregnation of the dry liner with the IPC resin may, therefore, occur at a later time and in a different location than where the liner was manufactured. Thus, the dry liner may be handled, stored and shipped prior to being impregnated with the IPC resin. For example, prior to use, the dry liner may be sent to an appropriate resin saturation facility where the liner may be impregnated with a suitable IPC resin system before being shipped to the worksite. The IPC resin may be any suitable resin system for use with CIPP liners. An example of a suitable IPC resin system includes, but is not limited to, a polyester or vinyl ester resin system containing a styrene monomer.

In an exemplary embodiment, the method of forming a dry repair liner for reinforcing a pipe utilizes a modified winding process that forms a continuous liner. The modified winding process includes a process for affixing overlapping layers of the liner material together in lieu of using the IPC resin to hold the layers together. As will be described in more detail below, some exemplary embodiments of the process for affixing the overlapping layers of the liner material together may include a separate resin or adhesive. The resin or adhesive used in the exemplary embodiments to affix the overlapping layers of the liner material together, however, may be distinguished from the IPC resin in a number of ways, as will be described below.

Figure 2:
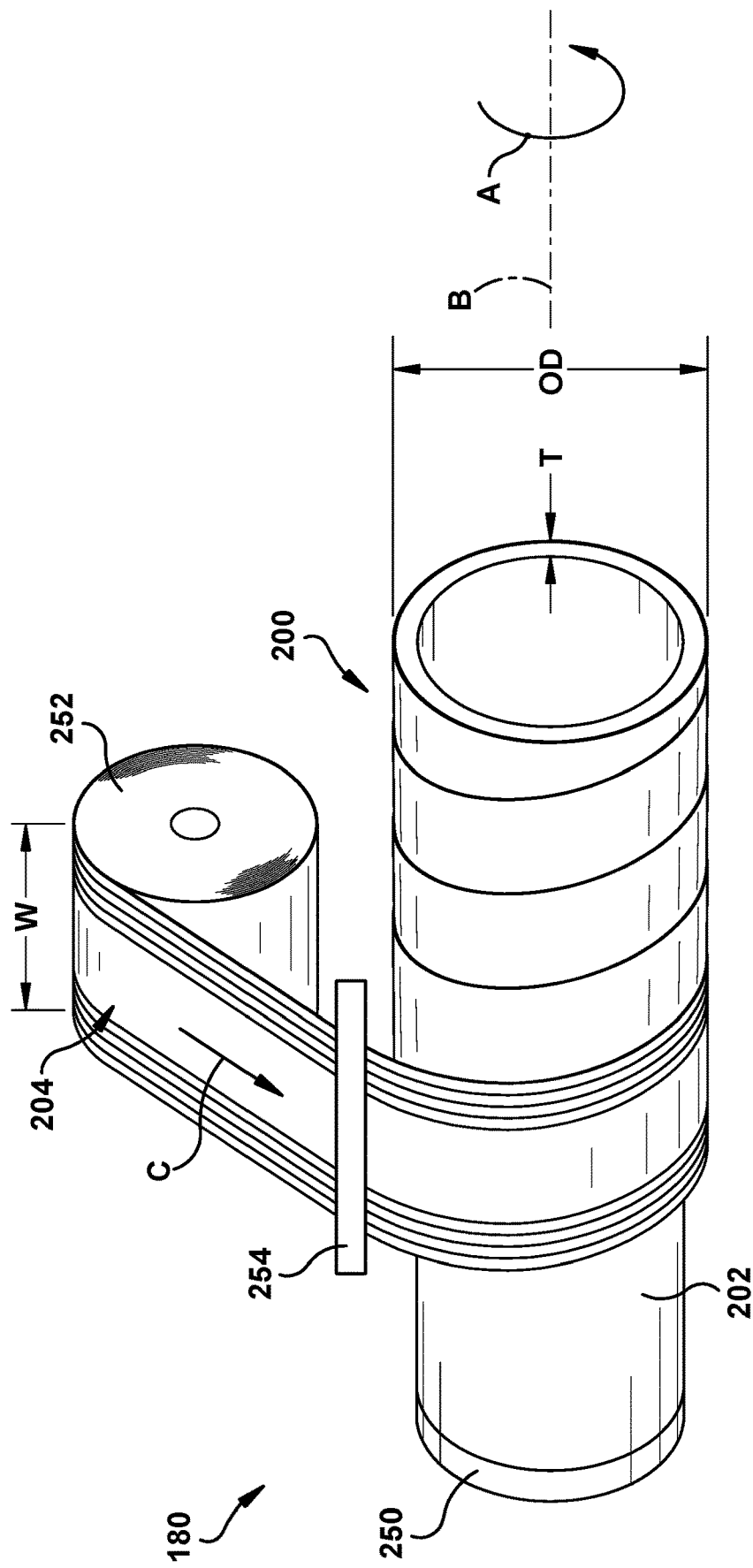
FIG. 2 is a schematic illustration of an exemplary embodiment of a method for manufacturing a CIPP liner.
Figure 3:
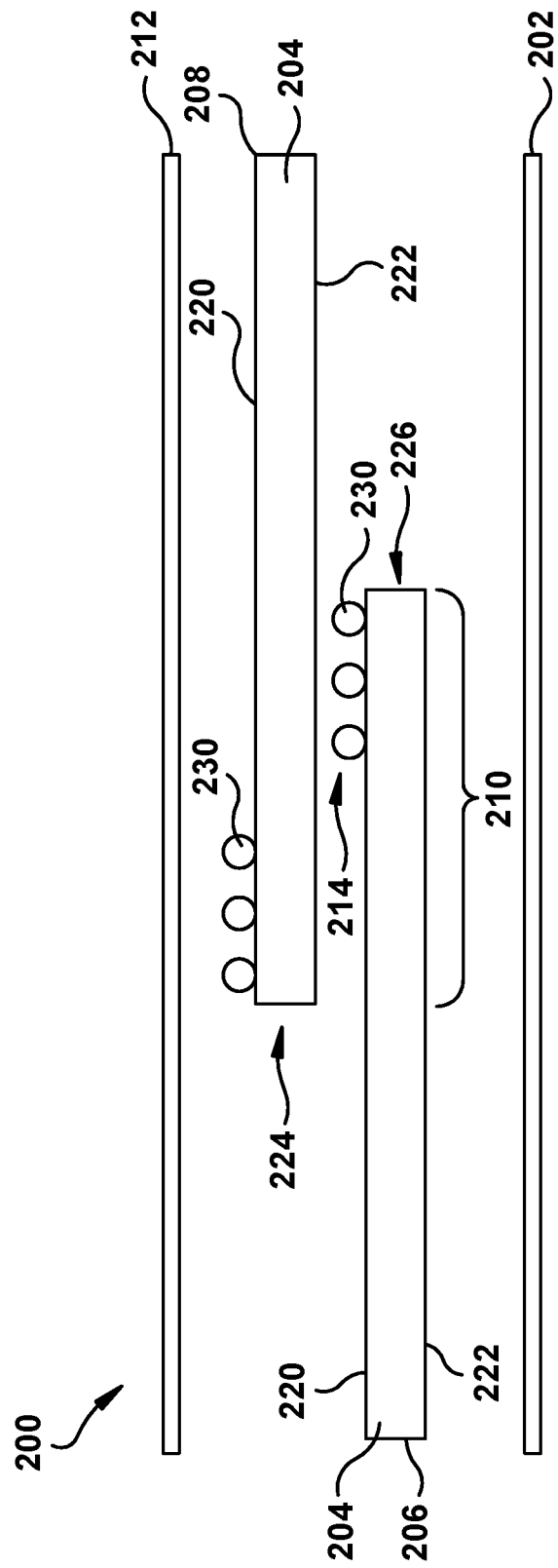
FIG. 3 is a cross-sectional side view of the layers of an exemplary embodiment of a CIPP liner.

FIG. 2 shows a schematic representation of an exemplary embodiment of a method 180 for manufacturing a CIPP liner 200, and FIG. 3 illustrates a partial exploded, cross-sectional side view of the layers of an exemplary embodiment of the CIPP liner 200. The liner 200 may be configured in a variety of ways. For example, different embodiments of the dry liner may include different materials, have different diameters and thicknesses, and vary in the number of materials and number of layers used. In the exemplary embodiment of FIG. 2, the liner 200 is illustrated as having an annular cross-section with an outer diameter OD and a thickness T. The liner 200, however, is flexible prior to curing; thus, the liner 200 may be folded generally flat for storage or collapsed to a smaller cross-section for insertion into a pipe. In addition, the outer diameter OD of the liner 200 may be expanded after insertion into a pipe.

Referring to FIG. 3, in the exemplary embodiment, the liner 200 includes a layer of inner foil 202 and spirally wound reinforcing material 204 that forms multiple partially overlapping layers of the material. The number of overlapping layers is dependent on how tightly the reinforcing material 204 is wound. In the exemplary embodiment of FIG. 3, the liner 200 includes a first layer 206 of the reinforcing material 204 and a second layer 208 of the reinforcing material 204 that partially overlaps the first layer 206 of the reinforcing material 204 in an overlapping region 210. In other exemplary embodiments, however, the liner 200 may have more than two overlapping layers. The liner 200 also includes a layer of outer foil 212 and a material 214 for affixing the first layer 206 of the reinforcing material 204 to the second layer 208 of the reinforcing material 206.

The inner foil layer 202 is configured to prevent leakage of the IPC resin, once the liner 200 has been impregnated with the IPC resin, and to provide a smooth inner surface. The inner foil layer 202 may also serve as a styrene barrier. Furthermore, in some embodiments, the inner foil layer 202 may be configured to allow UV light through the inner foil layer 202 to cure the IPC resin. The inner foil layer 202 may be configured in a variety of ways. For example, the type of and number of materials used for the inner foil layer 202 may vary in different embodiments. Any material capable of preventing leakage of the IPC resin, providing a smooth inner surface, allowing UV light to pass through and cure the IPC resin, and/or providing a styrene vapor barrier may be used. Suitable materials for the inner foil layer 202 include, but are not limited to, a polyamide, polypropylene, polyethylene, polyurethane, polyester, or combinations thereof.

The outer foil layer 212 is configured to form an outer protective layer and prevent leakage of the IPC resin after the liner 200 has been impregnated. In some embodiments, the outer foil layer 202 may also shield the resin from daylight/UV light to prevent the IPC resin, if it is UV light curable, from prematurely curing. The outer foil layer 212 may be configured in a variety of ways. For example, the type of and number of materials used for the outer foil layer 212 may vary for different embodiments of the liner 200. Any material capable of preventing leakage of the IPC resin and assisting in handling of the liner 200 may be used. Suitable materials for the outer foil layer 212 include, but are not limited to, a polyamide, a polypropylene, a polyethylene, a polyurethane, a polyester, or combinations thereof.

In the exemplary embodiment, the outer foil layer 202 includes a polyamide layer to act as a styrene barrier and a polyethylene layer to improve the ability to weld the outer foil layer 202. In the exemplary embodiment, the inner foil layer 202 and the outer foil layer 212 are the same material. In other embodiments, however, the inner foil layer 202 and the outer foil layer 212 may include different materials.

The reinforcing material 204 is positioned radially outward of the inner foil layer 202 and radially inward of the outer foil layer 212. The reinforcing material 204 is configured to provide reinforcing support in the direction of a longitudinal axis B of the liner 200 (see FIG. 2). The reinforcing material 204 may be configured in a variety of ways. For example, the type of and the number of materials used for the reinforcing material 204 may vary in different embodiments. Any material suitable for use in a CIPP liner and capable of providing longitudinal reinforcement to the liner 200 may be used. In some embodiments, the reinforcing material 204 may include reinforcing fibers incorporated into the material. Suitable reinforcing materials 204 include glass fiber fabrics that may be woven, nonwoven, knitted, or stitched, glass fiber mats, or other materials that contain fibers. In materials that include reinforcement fibers, the fibers used in the material may be any type of organic or synthetic fibers. In some exemplary embodiments, the reinforcement fibers include any one or more of glass, carbon, polyesters, polyolefins, nylons, aramids, poly(phenylene sulfide), polysulfone (PS), polyether sulfone (PES), polyacrilonitrile (PAN), silicon carbide (SiC), boron nitride, and the like. In some exemplary embodiments, the material may be a hybrid fabric (or layer) including multiple different types of fibers. The fibers may be continuous fibers or may be discontinuous, such as for example, chopped strand. The fibers may be directionally oriented or randomly oriented.

In the exemplary embodiment, the reinforcing material 204 includes a plurality of glass fibers. In one exemplary embodiment, the reinforcing material 204 is a fabric including oriented glass fibers to provide reinforcement in a specific direction. For example, in one exemplary embodiment, the glass fibers are oriented in the transversal direction of the liner to improve the mechanical properties of the liner in the hoop direction of the pipe. The glass fibers may be continuous fibers or discontinuous fibers. In one exemplary embodiment, the glass fibers are oriented, chopped fibers (e.g., oriented, chopped strand).

The material 214 for affixing the first layer 206 of the reinforcing material 204 to the second layer 208 may be configured in a variety of ways. Any material capable of affixing the first layer 206 of the reinforcing material 204 to the second layer 208, and suitable for use in CIPP liners, may be used. Furthermore, the material 214 may be positioned on, or incorporated in, the reinforcing material 204 in any suitable manner. In some exemplary embodiments, the material 214 may be locally applied or positioned only in the overlapping region 210 and may not be present in other portions of the reinforcing material. In other embodiments, however, the material 214 may be applied or positioned in other portions of the material as well. For example, in some embodiments, the material may be applied or positioned across substantiality all, or a majority of, the reinforcing material 204.

Referring to FIG. 3, the reinforcing material 204 includes a top surface 220, a bottom surface 222 opposite the top surface 220, a first edge portion 224, and a second edge portion 226 opposite the first edge portion 224. In the exemplary embodiment of FIGS. 2 and 3, the material 214 for affixing the first layer 206 of the reinforcing material 204 to the second layer 208 of the reinforcing material 204 includes a plurality of thermoplastic fibers 230.

The thermoplastic fibers 230 may be configured in a variety of ways. For example, the type or types of thermoplastic used, the number of fibers, the location of the fibers, the orientation of the fibers, and the size (e.g., diameter) of the fibers, may vary in different embodiments. Any thermoplastic fiber that may be melted and affix the first layer 206 of the reinforcing material 204 to the second layer 208 of the reinforcing material 204 may be used. Suitable thermoplastic material may include, but not be limited to, polypropylene, ethylene-vinyl acetate (EVA), and copolymers of polyester.

In the exemplary embodiment of FIGS. 2 and 3, the liner 200 includes a plurality of thermoplastic fibers 230 on the top surface 220 of the reinforcing material 204 in proximity to the first edge portion 224 and the second edge portion 226. The reinforcing material 204 includes a central longitudinal axis D (see FIG. 2). "In proximity to" the first edge portion 224 and the second edge portion 226 refers to thermoplastic fibers 230 being positioned closer to the first edge portion 224 and the second edge portion 226 than to the central longitudinal axis. In some embodiments, all of the plurality of thermoplastic fibers 230 may be positioned in proximity to the first edge portion 224 and the second edge portion 226. In other embodiments, some of the plurality of thermoplastic fibers 230 may be positioned in proximity to the first edge portion 224 and the second edge portion 226 while some of the plurality of thermoplastic fibers 230 may be positioned closer to the central longitudinal axis D.

In some embodiments, the thermoplastic fibers 230 may be positioned on the bottom surface 222, or on both the top surface 220 and the bottom surface 222 of the reinforcing material 204. Further in some embodiments, the thermoplastic fibers 230 may be positioned in proximity to only one of the first edge portion 224 and the second edge portion 226. In some embodiments, the thermoplastic fibers 230 may be integrated into the reinforcing material 204. For example, the thermoplastic fibers 230 may be woven into the reinforcing material 204 or otherwise formed with the reinforcing material 204. In some embodiments, the thermoplastic fibers 230 may be positioned across substantially the entire top surface 220, across substantially the entire bottom surface 224, or across substantially both of the entire top surface 220 and the entire bottom surface 222.

In the exemplary embodiment, the liner 200 includes three, generally parallel, rows of continuous thermoplastic fibers 230 on the top surface 220 of the reinforcing material 204 in proximity to each of the first edge portion 224 and the second edge portion 226. The thermoplastic fibers 230 generally extend in a longitudinal direction C of the material 204 (see FIG. 2). Each row of continuous thermoplastic fibers 230 may include a single thermoplastic fiber 230 or multiple fibers. In other embodiments, the liner 200 may include more or less than three rows of thermoplastic fibers 230. Furthermore, in some embodiments, the thermoplastic fibers 230 may not be arranged in rows, but may be arranged in some other suitable pattern or may be randomly arranged. Still further, in some embodiments, the thermoplastic fibers 230 may be discontinuous fibers arranged in any suitable orientation, including randomly oriented.

In one exemplary embodiment, the reinforcing material 204 has a width W (see FIG. 2) and the thermoplastic fibers 230 are positioned on, or incorporated in, about 5% to about 50% of the width W, or about 10% to about 40% of the width, or about 15% to about 30% of the width. In one exemplary embodiment, the thermoplastic fibers 230 are positioned on, or incorporated in, about 30% or less of the width W. In one exemplary embodiment, the reinforcing material 204 includes both glass fibers and thermoplastic fibers 230 at a ratio of about 1% to about 10%.

The thermoplastic fibers 230 may be positioned on the top surface 220 of the reinforcing material 204 in any suitable manner. Suitable methods of adhering the thermoplastic fibers 230 to the top surface 220 of the reinforcing material 204, may include, but not be limited to, melting the fibers, using an adhesive, spraying the fibers onto the top surface 220, winding the fibers 230 in between layers of the reinforcing material such that the winding tension of the reinforcing material holds the fibers in place between layers, and stitching the fibers into the reinforcing material 204. In one exemplary embodiment, the thermoplastic fibers 230 are partially melted onto the top surface 220 of the reinforcing material 204 to adhere to the reinforcing material 204. The thermoplastic fibers 230 may be melted in any suitable manner, such as but not limited to, infrared, laser, and hot air. In another exemplary embodiment, the thermoplastic fibers 230 are woven through the reinforcing material 204 along the length of the reinforcing material 204 or otherwise incorporated into the fabric.

Referring to the exemplary method 180 of forming the liner 200 illustrated in FIG. 2, a cylindrical mandrel 250 is provided. The mandrel 250 is configured to rotate in the direction shown by the arrow A about the central axis B. The diameter of the mandrel 250 may vary in different embodiments of the liner 200. In general, the diameter of the mandrel 250 is chosen to set the inner diameter of the liner 200.

The inner layer of foil 202 is placed around the mandrel 250 to form an inner layer of the liner 200. The inner layer of foil 202 may be placed around the mandrel 250 in any suitable manner. For example, in one exemplary embodiment the inner layer of foil 202 is formed as a bag and is pulled over the mandrel 250 prior to beginning the winding process.

A roll 252 of the reinforcing material 204 including the thermoplastic fibers 230 is provided adjacent the mandrel 250 and positioned to be spirally wound over the inner foil 202. As the mandrel 250 rotates, the reinforcing material 204 from the roll 252 is pulled or fed around the mandrel 250 in a spirally-wound fashion to create partially overlapping layers of the reinforcing material 204. The number of overlapping layers and the width of the overlapping region may vary in different exemplary embodiments of the liner 200. For example, the number of layers of the material can be selected to achieve the desired thickness of the liner 200.

In the illustrated embodiment, a melting device 254 is provided and configured to melt, at least partially, the thermoplastic fibers 230 such that the melted fibers adhere the overlapping, spirally-wound layers of the reinforcing material 204 together. In the illustrated embodiment, a single melting device 254 is shown. In other embodiments, however, more than one melting device may be used.

In the illustrated embodiment, the melting device 254 is positioned generally over the reinforcing material 204 at a location between the roll 252 and the mandrel 250 prior to the reinforcing material 204 being wound onto the mandrel 250. The melting device 254, however, may be positioned in any suitable location for melting the thermoplastic fibers. For example, in some embodiments the melting device may be positioned under the reinforcing material or multiple melting devices may be position both over and under the material. In some embodiments, the melting device may be positioned at a location to melt the thermoplastic fibers after the reinforcing material is spirally wound onto the mandrel 250. For example, the melting device may be positioned over the mandrel 250 at a location that melts the thermoplastic fibers 230 in the reinforcing material 204 that has already been wound onto the mandrel 250. In one exemplary embodiment, the mandrel 250 acts as the heating device 254. For example, the mandrel 250 may be configured to be to a suitable temperature to at least partially melt the thermoplastic fibers 230.

The thermoplastic fibers 230, after being at least partially melted, affix the first layer 206 of the reinforcing material 204 to the second layer 208 of the reinforcing material 206 to form the dry liner 200. Prior to melting, the thermoplastic fibers 230 provide reinforcement in the longitudinal direction of the reinforcing material 204, as shown by arrow C in FIG. 2. The reinforcement provided by the thermoplastic fibers 230 limits stretching of the reinforcing material 204 as the reinforcing material is pulled from the roll 252. Once melted, however, the thermoplastic fibers 230 lose their tensile strength properties in the longitudinal direction C. As a result, the liner 200 may expand radially when placed in the pipe without being restricted by the thermoplastic fibers 230.

The melting device 254 may be any suitable device capable of at least partially melting the thermoplastic fibers 230. Suitable melting devices include, but are not limited to, devices that use infrared, laser, and hot air.

After the reinforcing material 204 has been wound onto the mandrel 250 and the overlapping layers of the reinforcing material 204 are affixed together, the outer layer of foil 212 may be applied over the reinforcing material 204 such that the outer foil layer 212 circumferentially surrounds the reinforcing material 204 and inner foil layer 202. In one exemplary embodiment, the outer foil 212 is applied directly after the winding. The reinforcing material 204 and inner foil layer 202 is sandwiched between a top layer of outer foil and a bottom layer of outer foil. The lateral edges of the top layer brought into contact with the corresponding lateral edges of the bottom layer and are sealed together to form closed shape or tube around the reinforcing material 204 and inner foil layer 202.

After the outer foil 212 has been applied, the dry liner 200 may be packaged for storage or shipment, such as for example, by rolling the liner into a roll or folding the liner into a folded stack. Since the liner 200 has not yet been impregnated with the IPC resin, the liner is lighter and easier to handle than a resin-impregnated liner.

To apply the IPC resin, an opening is formed in the outer foil layer and the resin is injected into the dry liner. The opening is then resealed and the resin is distributed through the liner by vacuum, rollers, or other suitable methods.

Figure 4:
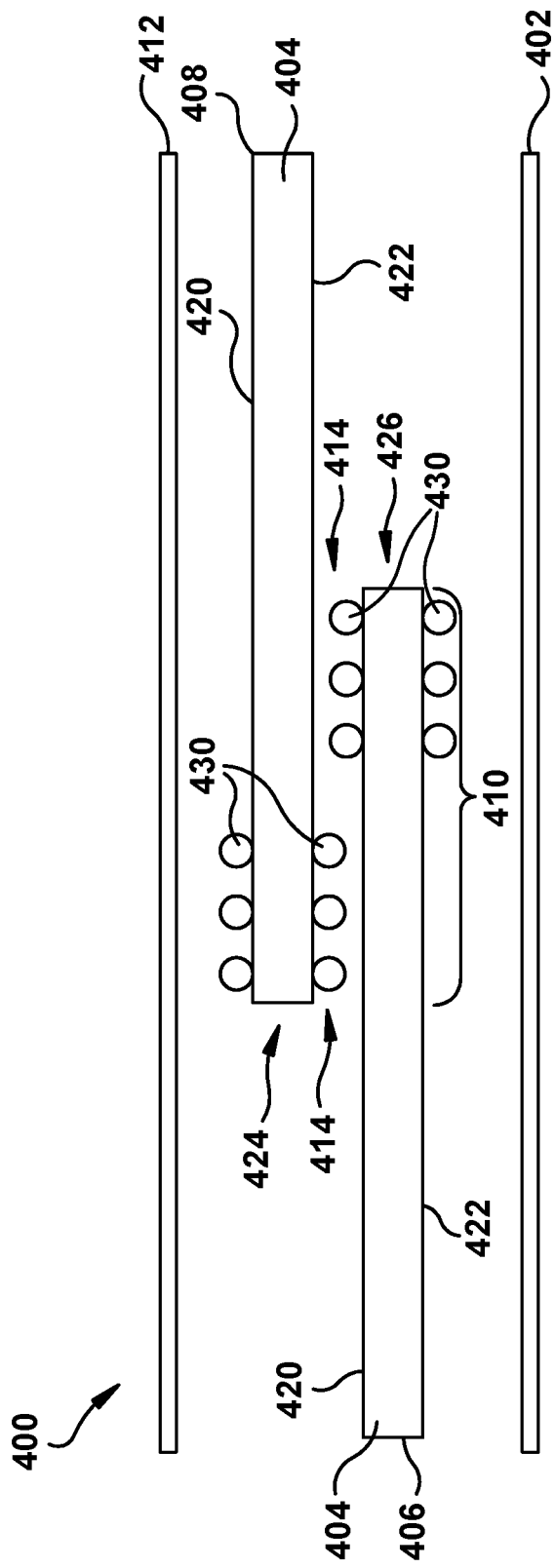
FIG. 4 is a cross-sectional side view of the layers of another exemplary embodiment of a CIPP liner.

FIG. 4 illustrates another exemplary embodiment of a liner 400. The liner 400 is substantially similar to the exemplary embodiment of the liner 200 of FIG. 3 in that the liner 400 includes a layer of inner foil 402 and spirally wound reinforcing material 404 that forms multiple partially overlapping layers of the material. The number of overlapping layers is dependent on how tightly the reinforcing material 404 is wound. In the exemplary embodiment of FIG. 4, the liner 400 includes a first layer 406 of the reinforcing material 404 and a second layer 408 of the reinforcing material 404 that partially overlaps the first layer 406 of the reinforcing material 404 in an overlapping region 410. In other exemplary embodiments, however, the liner 400 may have more than two overlapping layers. The liner 400 also includes a layer of outer foil 412 and a material 414 for affixing the first layer 406 of the reinforcing material 404 to the second layer 408 of the reinforcing material 404.

The reinforcing material 404 includes a top surface 420, a bottom surface 422 opposite the top surface 420, a first edge portion 424, and a second edge portion 426 opposite the first edge portion 424. The material 414 for affixing the first layer 406 of the reinforcing material 404 to the second layer 408 of the reinforcing material 404 includes a plurality of thermoplastic fibers 430. In the exemplary embodiment of FIG. 4, the liner 400 includes thermoplastic fibers on both the top surface 420 and the bottom surface 422 of the reinforcing material 404 in proximity to both the first edge portion 424 and the second edge portion 426.

The liner 400 may be formed in the same manner as the liner 200. In particular, the reinforcing material 404 is spirally wound around a mandrel with the thermoplastic fibers 430 melted to affix the first layer 406 of the reinforcing material 404 to the second layer 408 of the reinforcing material 404.

Figure 5:
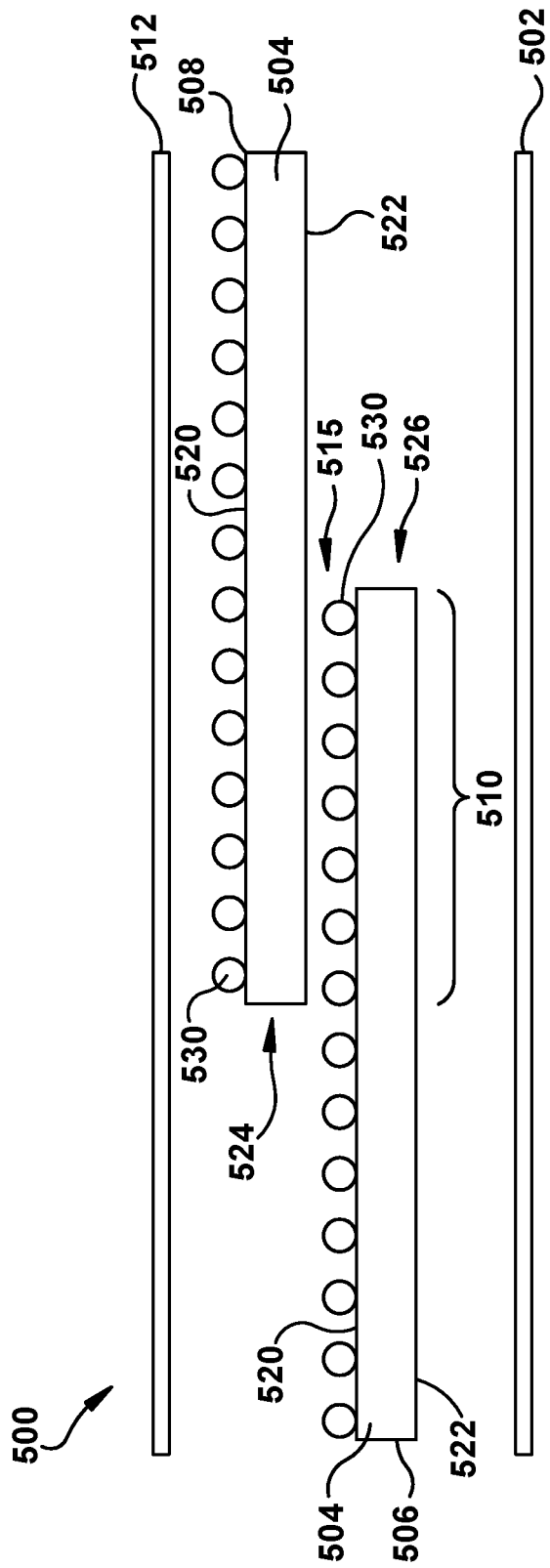
FIG. 5 is a cross-sectional side view of the layers of another exemplary embodiment of a CIPP liner.

FIG. 5 illustrates another exemplary embodiment of a liner 500. The liner 500 is substantially similar to the exemplary embodiment of the liner 200 of FIG. 3 in that the liner 500 includes a layer of inner foil 502 and spirally wound reinforcing material 504 that forms multiple partially overlapping layers of the material. The number of overlapping layers is dependent on how tightly the reinforcing material 504 is wound. In the exemplary embodiment of FIG. 5, the liner 500 includes a first layer 506 of the reinforcing material 504 and a second layer 508 of the reinforcing material 504 that partially overlaps the first layer 506 of the reinforcing material 504 in an overlapping region 510. In other exemplary embodiments, however, the liner 500 may have more than two overlapping layers. The liner 500 also includes a layer of outer foil 512 and a material 514 for affixing the first layer 506 of the reinforcing material 504 to the second layer 508 of the reinforcing material 504.

The reinforcing material 504 includes a top surface 520, a bottom surface 522 opposite the top surface 520, a first edge portion 524, and a second edge portion 526 opposite the first edge portion 524. The material 514 for affixing the first layer 506 of the reinforcing material 504 to the second layer 508 of the reinforcing material 504 includes a plurality of thermoplastic fibers 530. In the exemplary embodiment of FIG. 5, the liner 500 includes thermoplastic fibers 530 across substantially the entire top surface 520 of the reinforcing material 506.

The liner 500 may be formed in the same manner as the liner 200. In particular, the reinforcing material 504 is spirally wound around a mandrel with the thermoplastic fibers 530 melted to affix the first layer 506 of the reinforcing material 504 to the second layer 508 of the reinforcing material 506.

Figure 6:
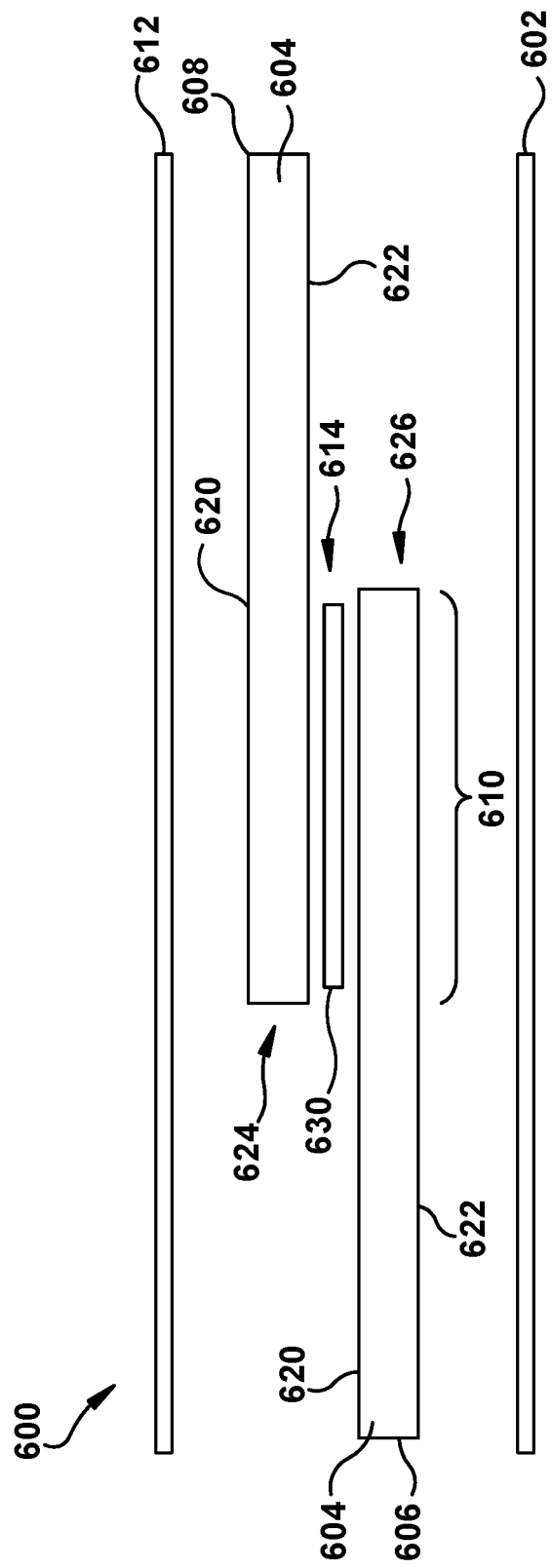
FIG. 6 is a cross-sectional side view of the layers of another exemplary embodiment of a CIPP liner.

FIG. 6 illustrates another exemplary embodiment of a liner 600. The liner 600 is substantially similar to the exemplary embodiment of the liner 200 of FIG. 3 in that the liner 600 includes a layer of inner foil 602 and spirally wound reinforcing material 604 that forms multiple partially overlapping layers of the material. The number of overlapping layers is dependent on how tightly the reinforcing material 604 is wound. In the exemplary embodiment of FIG. 6, the liner 600 includes a first layer 606 of the reinforcing material 604 and a second layer 608 of the reinforcing material 604 that partially overlaps the first layer 606 of the reinforcing material 604 in an overlapping region 610. In other exemplary embodiments, however, the liner 600 may have more than two overlapping layers. The liner 600 also includes a layer of outer foil 612 and a material 614 for affixing the first layer 606 of the reinforcing material 604 to the second layer 608 of the reinforcing material 604.

Figure 7:
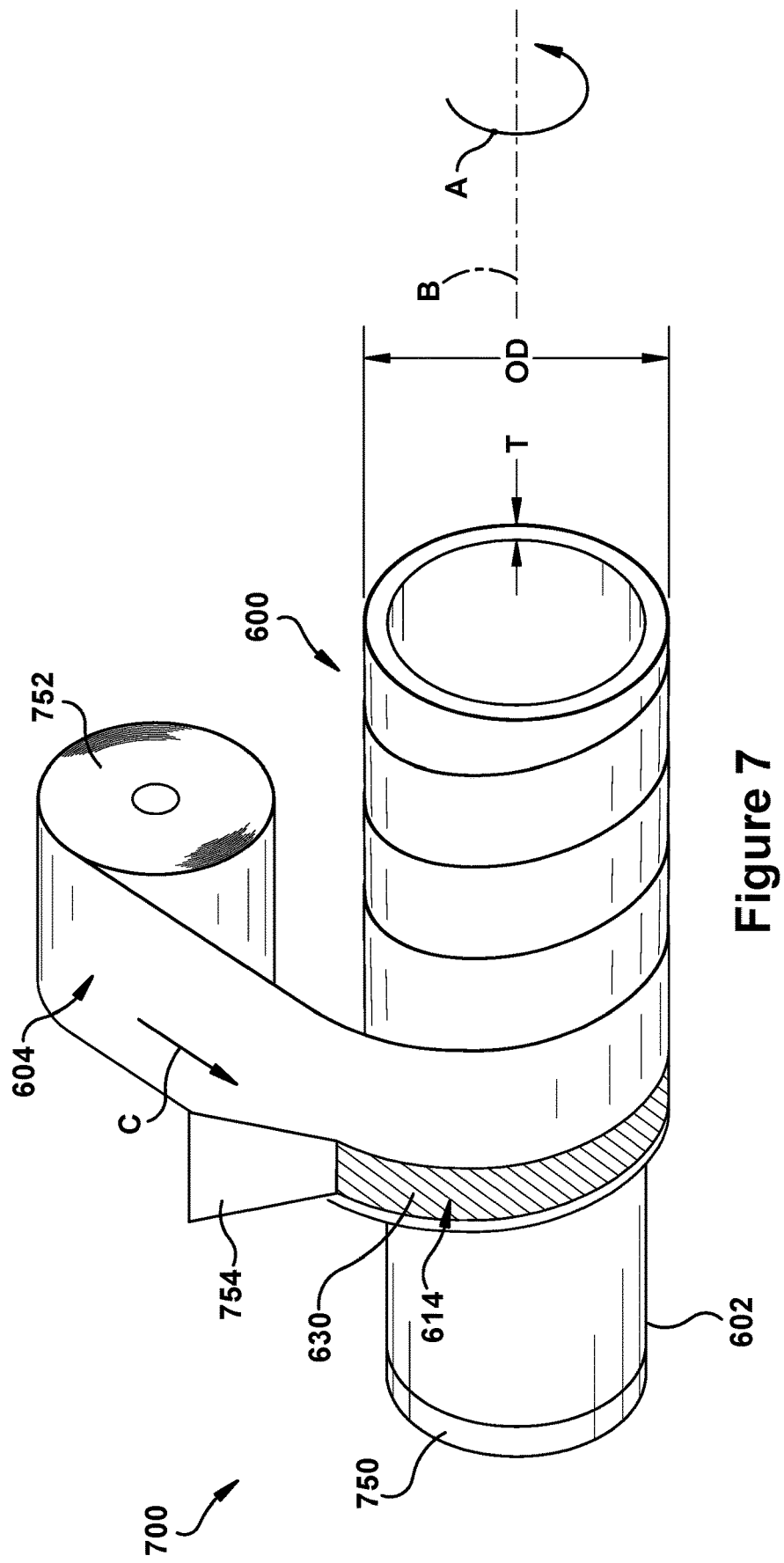
FIG. 7 is a schematic illustration of an exemplary embodiment of a method for manufacturing the CIPP liner of FIG. 6.

The reinforcing material 604 includes a top surface 620, a bottom surface 622 opposite the top surface 620, a first edge portion 624, and a second edge portion 626 opposite the first edge portion 624. The material 614 for affixing the first layer 606 of the reinforcing material 604 to the second layer 608 of the reinforcing material 604 includes an adhesive 630, such as a glue, resin, epoxy, tape (e.g., two-sided tape), or other suitable adhesive positioned in the overlapping region 610, such as for example, between the first layer 606 and the second layer 608. The adhesive 630 may be applied to the first layer 606, to the second layer 608, or to both the first layer and the second layer. The adhesive 630 may be configured in a variety of ways and applied in a variety of ways. In FIGS. 6 and 7, the adhesive 630 is shown as a single, continuous layer. In other embodiments, however, the adhesive 630 may be applied as multiple layers or as multiple, continuous or discontinuous portions For example, in one exemplary embodiment, the adhesive 630 maybe applied as a series of parallel strips or rows.

In some embodiments, heat and/or pressure may be applied to the reinforcing material 604 where the adhesive 630 is applied to improve the bond created by the adhesive 630. In other embodiments, however, the adhesive 630 may be selected such that heat and/or pressure need not be applied.

In one exemplary embodiment, the adhesive 630 may be applied as a powder. Suitable powders may include, but not be limited to, a Bisphenol A based polyester powder and co-polyester powders.

The powder adhesive 630 may be applied in any suitable manner, such as for example, but not limited to, by a spray gun. In some exemplary embodiments, once the powder adhesive 630 has been applied, heat and pressure may be applied to the reinforcing material 604 where the adhesive 630 is applied to cure the powder adhesive 630. Heat and pressure may be applied in any suitable manner. For example, heat may be applied with a heating device that uses infrared, laser, and hot air and pressure may be applied through the winding tension of the reinforcing material. In one exemplary embodiment, the temperature of the heat applied is above the melting point of the powder adhesive 630 and below the melting point of the thermoplastic fibers 230.

In some exemplary embodiments, the adhesive 630 may be a hot melt adhesive. Suitable hot melt adhesives include, but are not limited to, polyester and co-polyester hot melt adhesives. In one exemplary embodiment, the hot melt adhesive is an ethylene vinyl acetate (EVA) hot melt adhesive. The hot melt adhesive 630 may be applied in any suitable manner, such as for example, but not limited to, a glue gun. In some exemplary embodiments, once the hot melt adhesive 630 has been applied, pressure may be applied to the reinforcing material 604 where the adhesive 630 is applied to form a strong bond between the overlapping layers of reinforcing material 604. Pressure may be applied to the to the reinforcing material 604 in any suitable manner. For example, in one exemplary embodiment, pressure is applied by the winding tension of the reinforcing material 604.

In some exemplary embodiments, the adhesive 630 may be a liquid/solvent-based spray glue. Suitable liquid/solvent-based spray glues include, but are not limited to, rubber based spray glue containing organic solvent with a low boiling point (e.g., acetone, demethylether). In one exemplary embodiment, the liquid/solvent-based spray glues is AirTAC2/Econotac 2 from Airtech International Inc., of Huntington Beach, Calif.

The liquid/solvent-based spray glue 630 may be applied in any suitable manner, such as for example, but not limited to, a spray gun, a spray can, and a roll applicator. In some exemplary embodiments, once the liquid/solvent-based spray glue 630 has been applied, low pressure may be applied to the reinforcing material 604 where the adhesive 630 is applied to form a strong bond between the overlapping layers of reinforcing material 604. Pressure may be applied to the to the reinforcing material 604 in any suitable manner. For example, in one exemplary embodiment, pressure is applied by the winding tension of the reinforcing material 604.

Unlike the IPC resin system that saturates the liner 600 and is used to cure the liner after installation in the pipe, the adhesive 630 used to affix the overlapping layers of reinforcing material 604 together is applied in much lower amounts than the IPC resin. In addition, the adhesive 630 may be applied only on certain areas of the liner 600, such as for example, within, or generally within, the overlapping region 610. For example, conventionally, the IPC resin accounts for about 50% of the weight of the liner 600 after the liner has been impregnated. Conversely, the adhesive 630 accounts for only a fraction of that amount, such as for example, less than 2% of the weight of the liner after the liner has been impregnated with the IPC resin.

FIG. 7 illustrates an exemplary embodiment of a method 700 of forming the liner 600 illustrated in FIG. 6. The method 700 is similar to the method 180 of FIG. 2 except that the material 614 for affixing overlapping layers of the reinforcing material 604 together includes the layer of an adhesive 630 rather than the thermoplastic fibers 230 of FIG. 2. In particular, the method 700 includes a cylindrical mandrel 750 configured to rotate in the direction shown by the arrow A about the central axis B. The inner layer of foil 602 is wrapped around the mandrel 750 to form an inner layer of the liner 600.

A roll 752 of the reinforcing material 604 is provided adjacent the mandrel 750 and positioned to be spirally wound over the inner foil 602. As the mandrel 750 rotates, the reinforcing material 604 from the roll 752 is pulled or fed around the mandrel 750 in a spirally-wound fashion to create partially overlapping layers of the reinforcing material 604. The number of overlapping layers and the width of the overlapping region may vary in different exemplary embodiments of the liner 600.

In the illustrated embodiment, one of more adhesive applicators 754 are provided and configured to apply the layer of adhesive 630 in, at least partially, the overlapping region 610 (see FIG. 6). In the illustrated embodiment, a single adhesive applicator 754 is shown. In other embodiments, however, more than one adhesive applicator 754 may be used. In the illustrated embodiment, the adhesive applicator 754 is positioned generally over the second portion 626 of the reinforcing material 604 at a location between the roll 752 and the mandrel 750 prior to the reinforcing material 604 being wound onto the mandrel 750. The adhesive applicator 754, however, may be positioned in any suitable location for applying adhesive 630 to the reinforcing material 604. For example, in some embodiments one or more adhesive applicators 754 may be positioned under the reinforcing material 604 or positioned both over and under the reinforcing material 604.

In some embodiments, after the adhesive 630 has been applied and the overlapping layer of the reinforcing material 604 has been wound onto the mandrel 750 such that the adhesive 630 is positioned in the overlapping region 610, heat and/or pressure may be applied to the overlapping region 610 or to the entire liner 600. The heat and/or pressure aids the adhesive in forming a strong bond between the overlapping layers of the reinforcing material 604.

After the reinforcing material 604 has been wound onto the mandrel 750 and the overlapping layers of the reinforcing material 604 are affixed together, the outer foil layer 612 may be applied over the reinforcing material 604. After the outer foil layer 612 has been applied, the dry liner 600 may be packaged for storage or shipment, such as for example, by rolling the liner into a roll or folding the liner into a folded stack.

Figure 8:
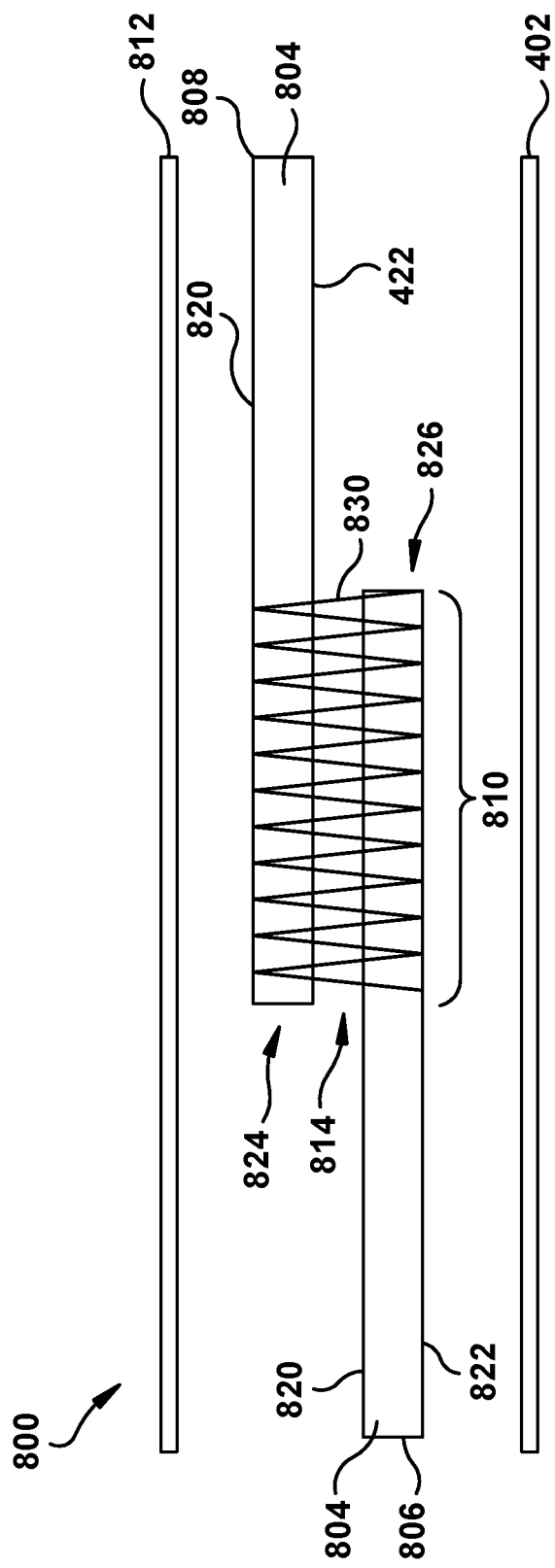
FIG. 8 is a cross-sectional side view of the layers of another exemplary embodiment of a CIPP liner.

FIG. 8 illustrates another exemplary embodiment of a liner 800. The liner 800 is substantially similar to the exemplary embodiment of the liner 200 of FIG. 3 in that the liner 800 includes a layer of inner foil 802 and spirally wound reinforcing material 804 that forms multiple partially overlapping layers of the material. The number of overlapping layers is dependent on how tightly the reinforcing material 804 is wound. In the exemplary embodiment of FIG. 8, the liner 800 includes a first layer 806 of the reinforcing material 804 and a second layer 808 of the reinforcing material 804 that partially overlaps the first layer 806 of the reinforcing material 804 in an overlapping region 810. In other exemplary embodiments, however, the liner 800 may have more than two overlapping layers. The liner 800 also includes a layer of outer foil 812 and a material 814 for affixing the first layer 806 of the reinforcing material 804 to the second layer 808 of the reinforcing material 804.

The reinforcing material 804 includes a top surface 820, a bottom surface 822 opposite the top surface 820, a first edge portion 824, and a second edge portion 826 opposite the first edge portion 824. The material 814 for affixing the first layer 806 of the reinforcing material 804 to the second layer 808 of the reinforcing material 804 includes stitching, needling, stapling, or some other form of mechanical entanglement 830 between overlapping layers of the reinforcing material 804.

The stitching, needling, stapling, or other form of mechanical entanglement 830 may be configured in a variety of ways. Any stitching, needling, stapling, or other form of mechanical entanglement capable of affixing overlapping layers of the reinforcing material 804 together may be used. In the exemplary embodiment, the overlapping layers of the reinforcing material 804 are stitched together in the overlapping region 810. The stitching 830 is stitched or woven through the first layer 806 and the second layer 808 in the overlapping region 810 to affix the layers together. The stitching 830 may be flexible to enhance the stretching and pliability of the liner 800. The stitching 830 may be made from an elastic or rubbery-type of material. Suitable material for the stitching includes, but is not limited to, a polyester or polyamide. In one exemplary embodiment, the stitching 830 includes elastic yarns or the like. In one exemplary embodiment, the stitching 830 is an unstretched polyester yarn or other material that can be stretched.

Figure 9:
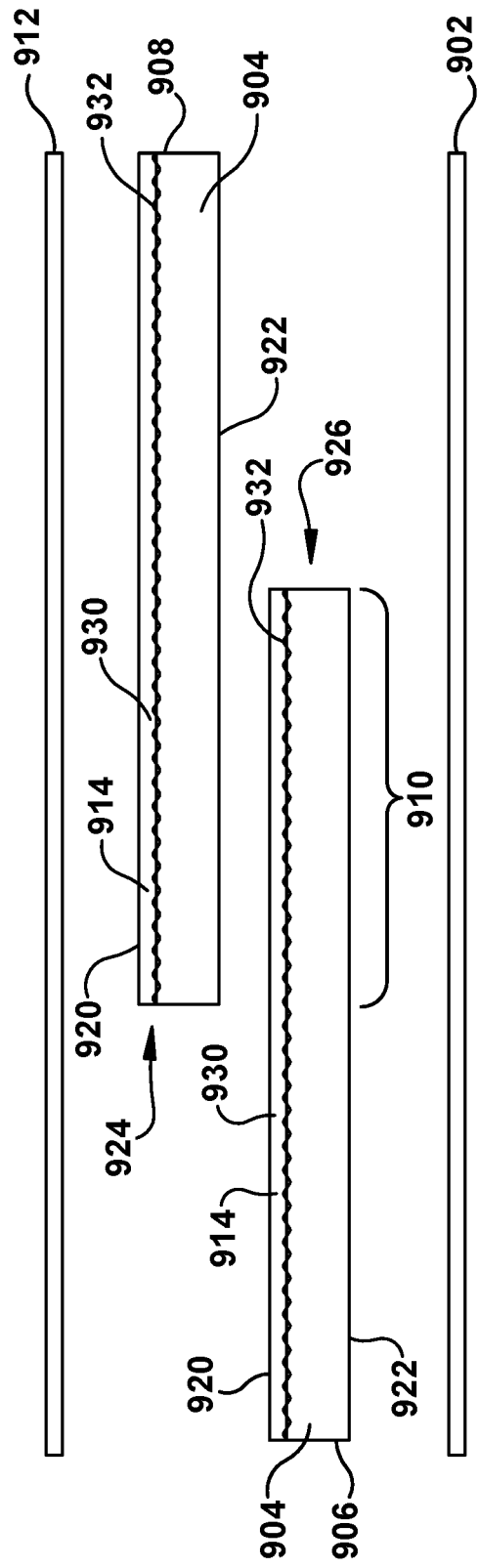
FIG. 9 is a cross-sectional side view of the layers of another exemplary embodiment of a CIPP liner.

FIG. 9 illustrates another exemplary embodiment of a liner 900. The liner 900 is substantially similar to the exemplary embodiment of the liner 200 of FIG. 3 in that the liner 900 includes a layer of inner foil 902 and spirally wound reinforcing material 904 that forms multiple partially overlapping layers of the material. The number of overlapping layers is dependent on how tightly the reinforcing material 904 is wound. In the exemplary embodiment of FIG. 9, the liner 900 includes a first layer 906 of the reinforcing material 904 and a second layer 908 of the reinforcing material 904 that partially overlaps the first layer 906 of the reinforcing material 904 in an overlapping region 910. In other exemplary embodiments, however, the liner 900 may have more than two overlapping layers. The liner 900 also includes a layer of outer foil 912 and a material 914 for affixing the first layer 906 of the reinforcing material 904 to the second layer 908 of the reinforcing material 904.

The reinforcing material 904 includes a top surface 920, a bottom surface 922 opposite the top surface 920, a first edge portion 924, and a second edge portion 926 opposite the first edge portion 924. The material 914 for affixing the first layer 906 of the reinforcing material 904 to the second layer 908 of the reinforcing material 904 includes a veil 930 attached to the reinforcing material.

The veil 930 is configured such that it can be melted in order to adhere the first layer 906 of the reinforcing material 904 to the second layer 908 of the reinforcing material 904. The veil 930 may be configured in a variety of ways. For example, the materials used for the veil, the dimensions of the veil and the position of the veil relative to the reinforcing material may vary in different embodiments. Any configuration that allows the veil 930 to be melted such that the veil 930 adhere the first layer 906 of the reinforcing material 904 to the second layer 908 of the reinforcing material 904 may be used.

In the exemplary embodiment, the veil 930 includes both glass fibers and thermoplastic fibers. Any suitable thermoplastic fibers may be used. In one exemplary embodiment, the veil 930 includes glass fibers and polyester fibers. In another exemplary embodiment, the entire veil is made of polyester. In the illustrated embodiment of FIG. 9, the veil 930 is attached to the top surface 920 of the reinforcing material 904 and spans substantially across the entire top surface. In other embodiments, however, the veil 930 may be attached to the bottom surface 922 or both the top surface 920 and the bottom surface 922 and may span less that across substantially the entire surface.

The veil 930 may be attached to the top surface 920 or bottom surface 922 by any suitable means. For example, in one exemplary embodiment, the veil 930 is attached to the reinforcing material 904 by stitching, needling, stapling, or some other form of mechanical entanglement 932.

Other Variations

Other variations of exemplary embodiments of the method and apparatus for manufacturing a liner for reinforcing a pipe are described below.

[A]. A method of manufacturing a dry liner for reinforcing a pipe, the method comprising: spirally winding, a glass fiber-reinforced, continuous material around a mandrel such that a subsequent layer of the glass fiber-reinforced, continuous material at least partially overlaps a preceding layer of the material to form an overlapping region; affixing the subsequent layer of material to the preceding layer of material in the overlapping region.

[B]. The method of [A], wherein one or more thermoplastic fibers are attached to, or integrated with, the material in the overlapping region, and wherein affixing the subsequent layer of material to the preceding layer of material in the overlapping region further comprises at least partially melting the one or more thermoplastic fibers.

[C]. The method of [B], wherein the one or more thermoplastic fibers includes polypropylene.

[D]. The method of any one of [B-C], further comprising applying pressure to the overlapping region after melting the one or more thermoplastic fibers.

[E]. The method of any one of [B-D], wherein the material includes a plurality of continuous thermoplastic fibers in the overlapping region.

[F]. The method of [E], wherein the plurality of continuous thermoplastic fibers are arranged in two or more parallel rows of fibers.

[G]. The method of [A], wherein a veil comprising a mixture of glass fibers and polyester fibers is attached to the glass fiber-reinforced, continuous material, and wherein affixing the subsequent layer of material to the preceding layer of material in the overlapping region further comprises at least partially melting polyester fibers of the veil.

[H]. The method of [A], wherein affixing the subsequent layer of material to the preceding layer of material in the overlapping region further comprises applying an adhesive onto the material such that the adhesive is at least partially located in the overlapping region.

[I]. The method of [H], further comprising applying heat and pressure to the liner in the overlapping region.

[J]. The method of any one of [H-I] wherein the adhesive includes a powder resin, a hot melt adhesive, a liquid/solvent-based spray glue, or a combination thereof.

[K]. The method of [A], wherein affixing the subsequent layer of material to the preceding layer of material in the overlapping region further comprises mechanically entangling the subsequent layer of material to the preceding layer of material in the overlapping region.

[L]. The method of [K], wherein mechanically entangling the subsequent layer of material to the preceding layer of material in the overlapping region further comprises stitching the preceding layer of material and subsequent layer of material together.

[M]. The method of any one of [A-L], further comprising removing the dry liner from the mandrel prior to impregnating the dry liner with a resin.

[N]. A dry liner for use in reinforcing a pipe, the dry liner comprising: a spirally wound, glass fiber-reinforced material forming a first layer and a second layer that at least partially overlaps the first layer to form an overlapping region; and a second material that affixes the first layer to the second layer in the overlapping region.

[O]. The dry liner of [N], wherein the second material includes a plurality of thermoplastic fibers that are melted to affix the first layer to the second layer.

[P]. The dry liner of [O], wherein the thermoplastic fibers were attached to the glass fiber-reinforced material prior to melting.

[Q]. The dry liner of any one of [O-P], wherein the thermoplastic fibers are continuous fibers.

[R]. The dry liner of [N], wherein the second material includes an adhesive applied to the glass fiber-reinforced material at least partially in the overlapping region.

[S]. The dry liner of [R], wherein the adhesive is applied to the first layer, the second layer, or both the first layer and the second layer.

[T]. The dry liner of any one of [R-S], wherein the adhesive includes a powder resin, a hot melt adhesive, a liquid/solvent-based spray glue, or a combination thereof.

[U]. The dry liner of [N], wherein the second material includes a mechanical entanglement.

[V]. The dry liner of [U], wherein the mechanical entanglement includes stitching or needling.

[W]. The dry liner of [N], wherein the second material includes a veil comprising a mixture of glass fibers and polyester fibers.

[X]. A glass fiber-reinforced material for use in forming a dry liner for reinforcing a pipe, the glass fiber-reinforced material comprising: a reinforcing layer including glass fibers, the reinforcing layer having a top surface, a bottom surface opposite the top surface, a first edge portion, and a second edge portion opposite the first edge portion; and a plurality of thermoplastic fibers positioned in proximity to the first edge portion and the second edge portion.

[Y]. The glass fiber-reinforced material of [X], wherein the thermoplastic fibers include polypropylene.

[Z]. The glass fiber-reinforce material of any one of [X-Y], wherein the thermoplastic fibers are attached to the top surface of the reinforcing layer.

[AA]. The glass fiber-reinforced material of any one of [X-Y], wherein the thermoplastic fibers are attached to both the top surface and the bottom surface.

[BB]. The glass fiber-reinforced material of any one of [X-Y], wherein the thermoplastic fibers are positioned in proximity to only one, or both, of the first edge portion and the second edge portion.

[CC]. The glass fiber-reinforced material of any one of [X-Y], wherein the thermoplastic fibers are woven into the reinforcing layer.

While various inventive aspects, concepts, and features of the general inventive concepts are described and illustrated herein in the context of various exemplary embodiments, these various aspects, concepts, and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts, and features of the inventions (such as alternative materials, structures, configurations, methods, circuits, devices and components, software, hardware, control logic, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the general inventive concepts even if such embodiments are not expressly disclosed herein. Additionally, even though some aspects, concepts, or features of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, concepts, and features may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A method of manufacturing a dry liner for reinforcing a pipe, the method comprising:
   spirally winding, a glass fiber-reinforced, continuous material around a mandrel such that a subsequent layer of the glass fiber-reinforced, continuous material at least partially overlaps a preceding layer of the material to form an overlapping region;
   affixing the subsequent layer of material to the preceding layer of material in the overlapping region;
   wherein affixing the subsequent layer of material to the preceding layer of material in the overlapping region further comprises applying an adhesive between the subsequent layer of material and the preceding layer of material in the overlapping region.

2. A method of manufacturing a dry liner for reinforcing a pipe, the method comprising:
   spirally winding, a glass fiber-reinforced, continuous material around a mandrel such that a subsequent layer of the glass fiber-reinforced, continuous material at least partially overlaps a preceding layer of the material to form an overlapping region;
   affixing the subsequent layer of material to the preceding layer of material in the overlapping region;
   wherein one or more thermoplastic fibers are attached to, or integrated with, the material in the overlapping region, and wherein affixing the subsequent layer of material to the preceding layer of material in the overlapping region further comprises at least partially melting the one or more thermoplastic fibers.

3. The method of claim 2, wherein the one or more thermoplastic fibers includes polypropylene.

4. A method of manufacturing a dry liner for reinforcing a pipe, the method comprising:
   spirally winding, a glass fiber-reinforced, continuous material around a mandrel such that a subsequent layer of the glass fiber-reinforced, continuous material at least partially overlaps a preceding layer of the material to form an overlapping region;
   affixing the subsequent layer of material to the preceding layer of material in the overlapping region;
   wherein a veil comprising a mixture of glass fibers and polyester fibers is attached to the glass fiber-reinforced, continuous material, and wherein affixing the subsequent layer of material to the preceding layer of material in the overlapping region further comprises at least partially melting polyester fibers of the veil.

5. The method of claim 1 wherein the adhesive includes a powder resin, a hot melt adhesive, a liquid/solvent-based spray glue, or a combination thereof.

6. The method of claim 1, further comprising removing the dry liner from the mandrel prior to impregnating the dry liner with a resin.

7. A dry liner for use in reinforcing a pipe, the dry liner comprising:
   a continuous spirally wound, glass fiber-reinforced material forming a first layer and a second layer that at least partially overlaps the first layer to form an overlapping region; and
   a second material that affixes the first layer to the second layer in the overlapping region;
   wherein the second material includes an adhesive applied between the first layer and the second layer in the overlapping region.

8. A dry liner for use in reinforcing a pipe, the dry liner comprising:
   a continuous spirally wound, glass fiber-reinforced material forming a first layer and a second layer that at least partially overlaps the first layer to form an overlapping region; and
   a second material that affixes the first layer to the second layer in the overlapping region;
   wherein the second material includes a plurality of thermoplastic fibers that are melted to affix the first layer to the second layer.

9. A dry liner for use in reinforcing a pipe, the dry liner comprising:

a continuous spirally wound, glass fiber-reinforced material forming a first layer and a second layer that at least partially overlaps the first layer to form an overlapping region; and a second material that affixes the first layer to the second layer in the overlapping region;

wherein the second material includes a veil comprising a mixture of glass fibers and polyester fibers.

10. The method of claim 2, wherein the glass fiber-reinforced, continuous material includes a top surface and a bottom surface and wherein the one or more thermoplastic fibers are attached to the top surface.

11. The method of claim 2, wherein the glass fiber-reinforced, continuous material includes a top surface and a bottom surface and wherein the one or more thermoplastic fibers are attached to both the top surface and the bottom surface.

12. The method of claim 2, wherein the glass fiber-reinforced, continuous material has a width and the one or more thermoplastic fibers are positioned on, or integrated in, 5% to 50% of the width.

13. The method of claim 2, wherein at least partially melting the one or more thermoplastic fibers precedes spirally winding, the glass fiber-reinforced, continuous material around the mandrel.

14. The method of claim 1, further comprising applying heat, pressure, or a combination of both to the overlapping region after the adhesive is applied.

15. The method of claim 1, wherein the glass fiber-reinforced, continuous material includes a top surface and a bottom surface and the adhesive is applied to the top surface.

16. The method of claim 4, wherein the glass fiber-reinforced, continuous material includes a top surface and a bottom surface and the veil is attached to the top surface.

17. The method of claim 4, wherein the veil is attached to the glass fiber-reinforced, continuous material by mechanically entangling the veil to the glass fiber-reinforced, continuous material.

18. The dry liner of claim 8, wherein the one or more thermoplastic fibers includes polypropylene.

19. The dry liner of claim 7, wherein the adhesive includes a powder resin, a hot melt adhesive, a liquid/solvent-based spray glue, or a combination thereof.

20. The dry liner of claim 9, wherein the veil is mechanically entangled to the glass fiber-reinforced, continuous material.

* * * * *